United States Patent [19]
Walter

[11] 3,791,263
[45] Feb. 12, 1974

[54] AUXILIARY POWER STEERING, ESPECIALLY FOR MOTOR VEHICLES

[75] Inventor: Wolfgang Walter, Schwabisch, Germany

[73] Assignee: Zahnradfabrik Friedrichshafen Aktiengesellschaft, Postfach, Germany

[22] Filed: Apr. 3, 1972

[21] Appl. No.: 240,732

[30] Foreign Application Priority Data
Apr. 8, 1971   Germany............................ 2117140

[52] U.S. Cl....................... 92/86, 92/136, 308/174
[51] Int. Cl. ........................ F01b 31/18, F01b 9/00
[58] Field of Search.. 92/136, 86, 116, 138; 91/466, 91/380, 422; 308/174; 180/79.2

[56]           References Cited
           UNITED STATES PATENTS
2,147,352   2/1939   Robinson................................. 92/86
2,898,867   8/1959   Saalfrank................................ 92/86
3,010,335   11/1961  Foerster et al......................... 91/380
3,012,543   12/1961  Sheppard............................... 92/136
3,168,359   2/1965   Murphy................................. 308/174
3,602,101   8/1971   Jablonsky.............................. 91/422

FOREIGN PATENTS OR APPLICATIONS
1,073,611   4/1966   Great Britain......................... 91/380

*Primary Examiner*—Paul E. Maslousky
*Attorney, Agent, or Firm*—Zalkind, Horne & Shuster

[57]               ABSTRACT

A hydraulically operated piston and cylinder arrangement for power steering is provided at the steering column end of the steering spindle with a radial bearing and high low pressure sealing gaskets. The other end is provided with radial and thrust bearings. Both bearing arrangements are connected through channels to the exhaust for the cylinder for relieving oil leakage. The arrangement permits construction of the combination of steering spindle, piston and cylinder which shortens the length of the spindle from the steering column end to the point opposite the gear segment of the steering arm operated by the piston.

1 Claim, 1 Drawing Figure

PATENTED FEB 12 1974
3,791,263
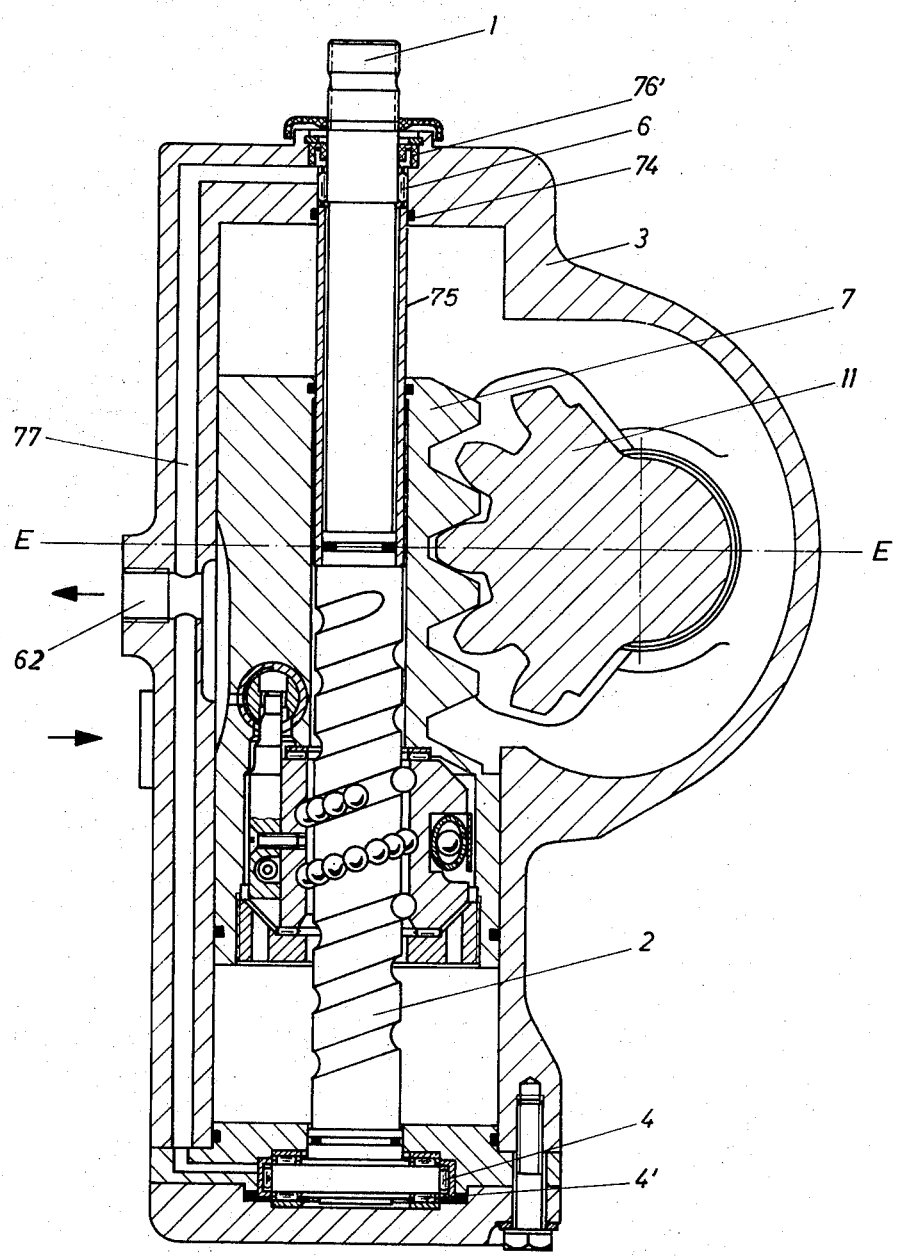

AUXILIARY POWER STEERING, ESPECIALLY FOR MOTOR VEHICLES

Reference is made to the U.S. Pat. No. to Jablonsky, 3,602,101, issued Aug. 31, 1971, assigned to the assignee of the present invention. In the patent a construction is shown which shortens the distance from the steering column end of the spindle to the median plane steering arm gear sector.

The present invention makes certain innovations in bearing and seal construction to still further minimize that distance and comprises a reduction in thickness of the end of the pressure cylinder casing through which the spindle passes. This is brought about by the use of a single radial needle bearing around the spindle and a high pressure sealing ring or gasket at one side of the bearing adjacent the pressure chamber of the cylinder together with a low pressure sealing ring adjacent the opposite side of the bearing. At the opposite end of the spindle, in the opposite end wall of the cylinder there is provided thrust bearing support as well as radial bearing support and sealing rings. Both of the bearings are connected via passage in the cylinder wall to a cylinder exhaust port for leakage drain.

A detailed description now follows in connection with the drawing in which the steering spindle 1 will be seen to pass through the end wall of a booster steering cylinder 3 and is provided with the worm thread 2 for booster steering function in the usual manner, all as described in the previous patent.

It will be noted that the inner end of the worm ends approximately in the plane E—E transverse of the spindle axis, passing through the rotary axis of the steering arm gear sector 11 which coacts with the rack on the pressure piston 7 through which the spindle passes. The length of the spindle portion rising upwardly from the plane E—E is shortened by providing a thinning of the end of the cylinder wall through which it passes. This construction is afforded by means of a high pressure sealing ring 74 and a low pressure sealing ring 76', a radial bearing 6 being between the rings. The high pressure ring 74 may be around a sealing collar 75 contiguously locating bearing 6, as shown and is disposed closely at the axial inner end of bearing 6 to protect that bearing from the pressures which would exist in the piston chamber. The low pressure ring 76' is closely disposed at the axially outer side of the bearing 6 and effects a seal against leakage as well as protection against dirt and foreign particles entering the system.

A channel 77 is provided longitudinally through the cylinder wall to relieve leakage from the bearing inasmuch as some leakage can and does occur and such leakage passes through the exhaust of the hydraulic system (not shown) through the exhaust port 62 of the cylinder.

The lower end of the spindle is supported in bearings within the opposite end wall construction of the cylinder. There is provided a radial bearing 4 for supporting and guiding a widened flange integral with the end of the spindle and there is further provided a thrust bearing 4' which will be noted as being a dual bearing on both sides of the flange since there is axial thrust exerted by the spindle in both directions.

Here again, the bearing region is connected via a bore to the outlet 62 to relieve oil leakage, such bore being a continuation of bore 77 with appropriate passageway in the end wall of the cylinder as shown. Suitable seals are provided as shown in such end wall which is constructed as two plates bolted to the cylinder end and which plates hold the bearings.

By means of the construction described, the shorter end of the spindle is made shorter still as compared with the aforementioned patent, being thus minimized by the lessening of the thickness of the upper end wall of the cylinder which is determined only by the thickness of the seals 74 and 76' and the bearing 6.

What is claimed is:

1. In a power steering device, a hydraulic cylinder, a piston therein, and a spindle passing through said piston; said spindle having a connection end for connection to a steering shaft; said cylinder having an integral end wall with a bore therethrough and the connection end of said spindle passing through said bore exteriorly of said cylinder; a radial bearing around said spindle and disposed within said bore and being radially supported by the wall thereof for bearing support of said spindle; a high pressure sealing ring encompassing said spindle at the axially inner side of said bearing and carried within the wall of said bore; a low pressure sealing ring encompassing said spindle within said bore and disposed on the axial outer side of said bearing; the axial opposite end wall of said cylinder having a removable closure means secured thereto; and radial and axial bearing means in said opposite end wall of said cylinder for radially and axially supporting the other end of said spindle; said spindle actuatably coacting with said piston, and a rack on said piston and a gear sector carried by said cylinder engaging said rack to be actuated thereby for operating a steering mechanism a sealing collar on said spindle having an axially outer and extending into said bore end said collar being disposed intermediate said high pressure seal and said spindle; said collar being supported on its axially inner end by said spindle and engaging said radial bearing for positioning thereof, said cylinder having an exhaust channel and passage means from said radial bearing and from said radial and axial bearing means to said exhaust channel to conduct leakage thereto.

* * * * *